US007065541B2

(12) United States Patent
Gupta et al.

(10) Patent No.: US 7,065,541 B2
(45) Date of Patent: Jun. 20, 2006

(54) DATABASE MIGRATION

(75) Inventors: Adarsh Gupta, Potomac, MD (US); Neil A. Katz, Parkland, FL (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/973,810

(22) Filed: Oct. 10, 2001

(65) Prior Publication Data

US 2003/0069903 A1    Apr. 10, 2003

(51) Int. Cl.
G06F 17/30 (2006.01)
G06F 15/16 (2006.01)

(52) U.S. Cl. .................. 707/204; 709/219; 709/201

(58) Field of Classification Search ............... 707/204, 707/102, 10, 200; 709/219, 201
See application file for complete search history.

(56) References Cited

U.S. PATENT DOCUMENTS

| | | | |
|---|---|---|---|
| 5,796,999 A * | 8/1998 | Azagury et al. ............. 707/10 |
| 5,862,328 A | 1/1999 | Colyer |
| 5,878,414 A | 3/1999 | Hsiao et al. |
| 5,923,833 A | 7/1999 | Freund et al. |
| 5,951,694 A | 9/1999 | Choquier et al. |
| 6,006,216 A | 12/1999 | Griffin et al. |
| 6,026,379 A | 2/2000 | Haller et al. |
| 6,035,307 A | 3/2000 | Martin et al. |
| 6,052,695 A | 4/2000 | Abe et al. |
| 6,061,725 A * | 5/2000 | Schwaller et al. .......... 709/224 |
| 6,076,095 A | 6/2000 | Clark et al. |
| 6,122,630 A | 9/2000 | Strickler et al. |
| 6,144,941 A | 11/2000 | Hotti et al. |
| 6,173,292 B1 | 1/2001 | Barber et al. |
| 6,219,689 B1 | 4/2001 | Mori |
| 6,304,882 B1 * | 10/2001 | Strellis et al. ............... 707/202 |
| 6,460,107 B1 * | 10/2002 | Rao et al. .................... 710/305 |
| 6,535,894 B1 * | 3/2003 | Schmidt et al. ............. 707/204 |
| 6,598,079 B1 * | 7/2003 | Pal et al. ..................... 709/226 |
| 2002/0161784 A1 * | 10/2002 | Tarenskeen ................. 707/200 |
| 2003/0220935 A1 * | 11/2003 | Vivian et al. ................ 707/102 |

OTHER PUBLICATIONS

Oracle7 Sever Distributed Systems, vol. II: Replicated Data, Release 7.3, Feb., 1996, Oracle Corporation.*

(Continued)

Primary Examiner—Greta Robinson
Assistant Examiner—Kuen S. Lu
(74) Attorney, Agent, or Firm—Spencer K. Warnick; Hoffman, Warnick & D'Alessandro LLC

(57) ABSTRACT

A database migration system and method that provides continuous transaction service during migration. The invention allows minimal transaction service down time during database migration. The active database is copied to a target and updated at least one time. In one preferred embodiment, updating occurs over decreasing time intervals. When the time intervals become sufficiently short, transition to the target server is implemented by queuing transaction requests from the source server and then executing them on the target server.

45 Claims, 5 Drawing Sheets

OTHER PUBLICATIONS

Oracle8i Administrator's Reference, Release 3 for Sun SPARC Solaris, Aug. 2000, Oracle Corporation.*
Replication ServerÓ Design Guide, Sybase Inc., May 29, 1988.*
Oracle7 Sever Distributed Systems, vol. II: Replicated Data, Release 7.3, Feb., 1996, Oracle Corporation.*
Oracle8i Administrator's Reference, Release 3 for Sun SPARC Solaris, Aug. 2000, Oracle Corporation.*
"ASP System for Transaction Base Applications," International Business Machines Corporation Disclosure, Dec. 11, 2000, pp. 1-14.

* cited by examiner

DATABASE MIGRATION

BACKGROUND OF THE INVENTION

1. Technical Field

The present invention relates generally to migrating a database, and more particularly, to migrating a database between a source server and a target server while providing transaction services.

2. Related Art

Moving a database from one server to another is useful for a number of reasons. One reason a database migration is required is to allow for installation, maintenance or repair of associated hardware or software. In this case, it is helpful to migrate the database to a temporary location, e.g., server, while work is completed. For instance, most relational database management systems (RDBMS) cannot support reorganization in an active or online mode. A database migration may also be necessary to increase storage or processing capability, or because of a relocation of a data center perhaps due to a corporate move.

Relative to current e-commerce, database migration has been found advantageous to increase access speed where end users are geographically dispersed. That is, having data closer to the end users provides faster database access, e.g., because of increased network speeds. One example of this model is the common practice of having hypertext markup language (HTML) caching servers implemented closer to end users to increase performance. In this case, however, each user has limited access to the database.

Today, however, more services require continuous access to the database. The application service provider (ASP) field is one area where this attribute is desired. In this industry, an end-user connects remotely through their local Internet service provider (ISP) and accesses an ASP application running on the ASP's server. Many ASP's provide applications having a high degree of interaction with the database. Since each user (e.g., organization receiving service from ASP) is accessing an application and, typically, has their own personalized access to the application, the user is constantly viewing, modifying, and adding to data sitting in the database. Since even more interaction with the database is provided under this and similar models, it is increasingly advantageous to have the database as close as possible to users to increase access speeds and improve transaction service. Transaction services may be the providing of any conduct relative to an application and/or information.

A problem that arises relative to providing continuous access to an active (e.g., online) database and migrating the database to be closer to users, is that the service down time conventionally required for database migration is unacceptable. This is especially the case where a database migration takes a large amount of time, e.g., because of the database size. Another problem relative to transfer of an active database is assuring that the database implemented at the new location is synchronized with the source database when the new location is activated.

In view of the foregoing, there is a need in the art for a system and method for migrating an active database from a source server to a target server while continuing to provide transaction service.

SUMMARY OF THE INVENTION

A first aspect of the invention is directed to a method of migrating a database from a first server to a second server while continuing to provide transaction service, the method comprising the steps of: providing transaction service on the first server; establishing a database copy on the second server; logging at least one transaction from the first server to create a transaction log; executing the at least one logged transaction on the second server; queuing at least one transaction request; executing the at least one queued transaction request on the second server; and providing transaction service on the second server.

A second aspect of the invention is directed to a method of providing continuous transaction service while migrating a database from a source to a target, the method comprising the steps of: providing transaction service on a server that accesses the source; establishing a copy of the database on the target; updating the database copy at least one time by: logging at least one transaction from the server that accesses the source to create a transaction log, and executing the at least one logged transaction on a server that accesses the target; queuing at least one transaction request; executing the at least one queued transaction request on the server that accesses the target; and providing transaction service on the server that accesses the target.

In a third aspect of the invention is provided a method of migrating a database from a source to a target while allowing continuous transaction service on at least one server that access the database, the method comprising the steps of: establishing an initial copy of the database on the target; updating the initial copy at least one time by: logging at least one transaction from a server that accesses the source to create a transaction log, and executing the at least one logged transaction on a server that accesses the target; queuing at least one transaction request; executing the at least one queued transaction request on the server that accesses the target.

A fourth aspect of the invention provides a system for migrating a database from a first server to a second server while continuing to provide transaction service, each server including an application that interacts with the database during execution of a transaction, the system comprising: a copy module that establishes a database copy on the second server; an updating module that updates the database copy at least one time by: logging at least one transaction from the first server received since any immediately preceding synchronization to create a transaction log; executing the at least one logged transaction on the second server; and a transition module that queues at least one transaction request, and executes the at least one queued transaction request on the second server.

A fourth aspect of the invention is drawn to a system for migrating a database from a first server to a second server while continuing to provide transaction service, each server including an application that interacts with the database during execution of a transaction, the system comprising: means for establishing a database copy on the second server; means for logging at least one transaction from the first server to create a transaction log; means for executing the at least one logged transaction on the second server; means for queuing at least one transaction request; and means for executing the at least one queued transaction request on the second server.

A fifth aspect of the invention is directed to a computer program product comprising a computer useable medium having computer readable program code embodied therein for migrating a database from a first server to a second server while continuing to provide transaction service, each server including an application that interacts with the database during execution of a transaction, the computer program product comprising: program code configured to establish a database copy on the second server; program code configured to update the database copy at least one time by: logging at least one transaction from the first server to create a transaction log, and executing the at least one logged transaction on the second server; program code configured to queue at least one transaction request; and program code configured to execute the at least one queued transaction request on the second server.

A sixth aspect of the invention is directed to a system for providing continuous transaction service while migrating a database, the system comprising: a source server for providing transaction service; a target server for providing transaction services; a copy module that establishes a database copy on the target server; an updating module that updates the database copy at least one time by: logging at least one transaction from the source server received since any immediately preceding synchronization to create a transaction log; executing the at least one logged transaction on the target server; and a transition module that queues at least one transaction request, and executes the at least one queued transaction request on the target server.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE INVENTION

The invention includes a database migration system and method for providing continuous transaction service while migrating a database from a source server to a target server.

Figure 1A:
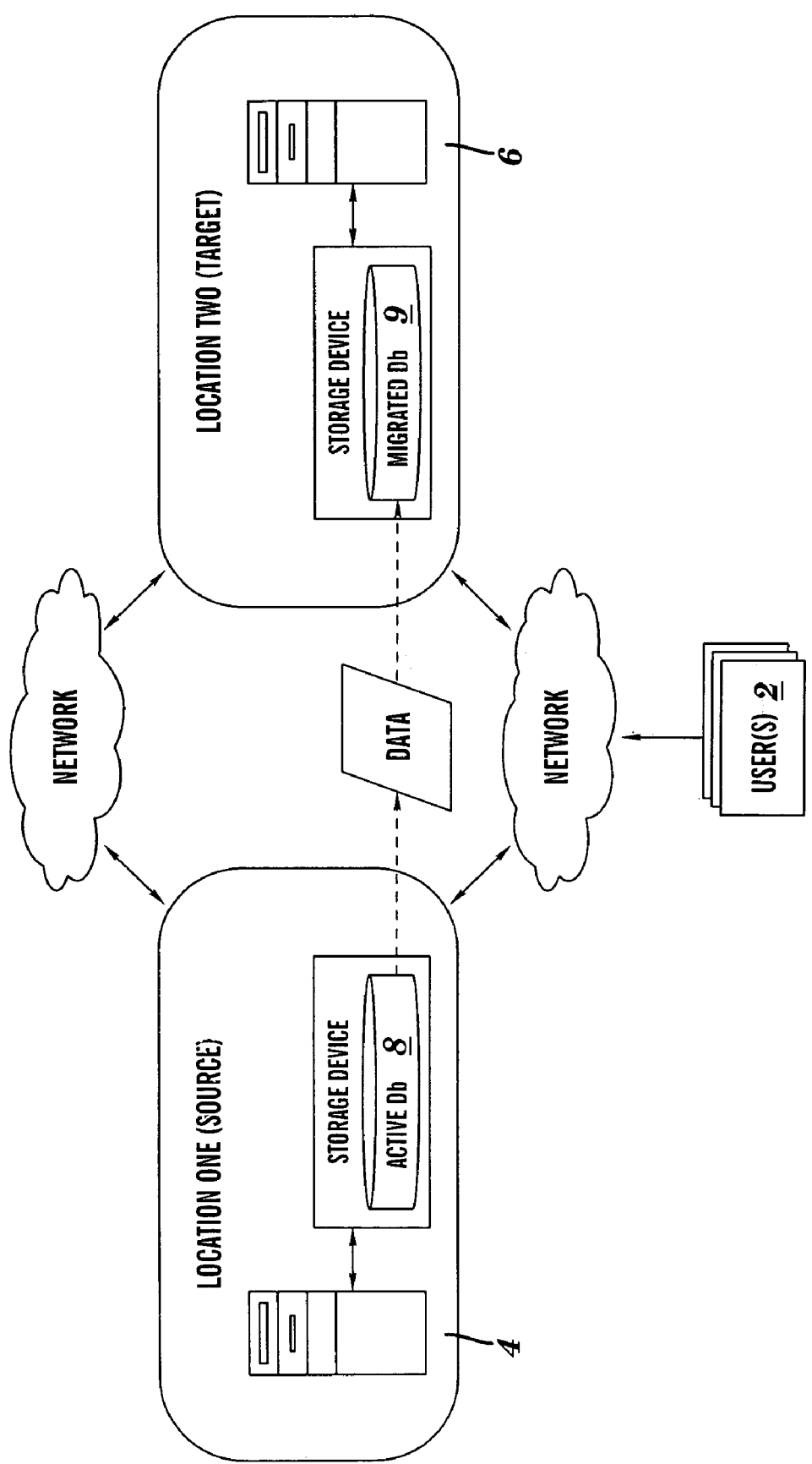
FIGS. 1A–B show exemplary environments in which the teachings of the invention are utilized.
Figure 1B:
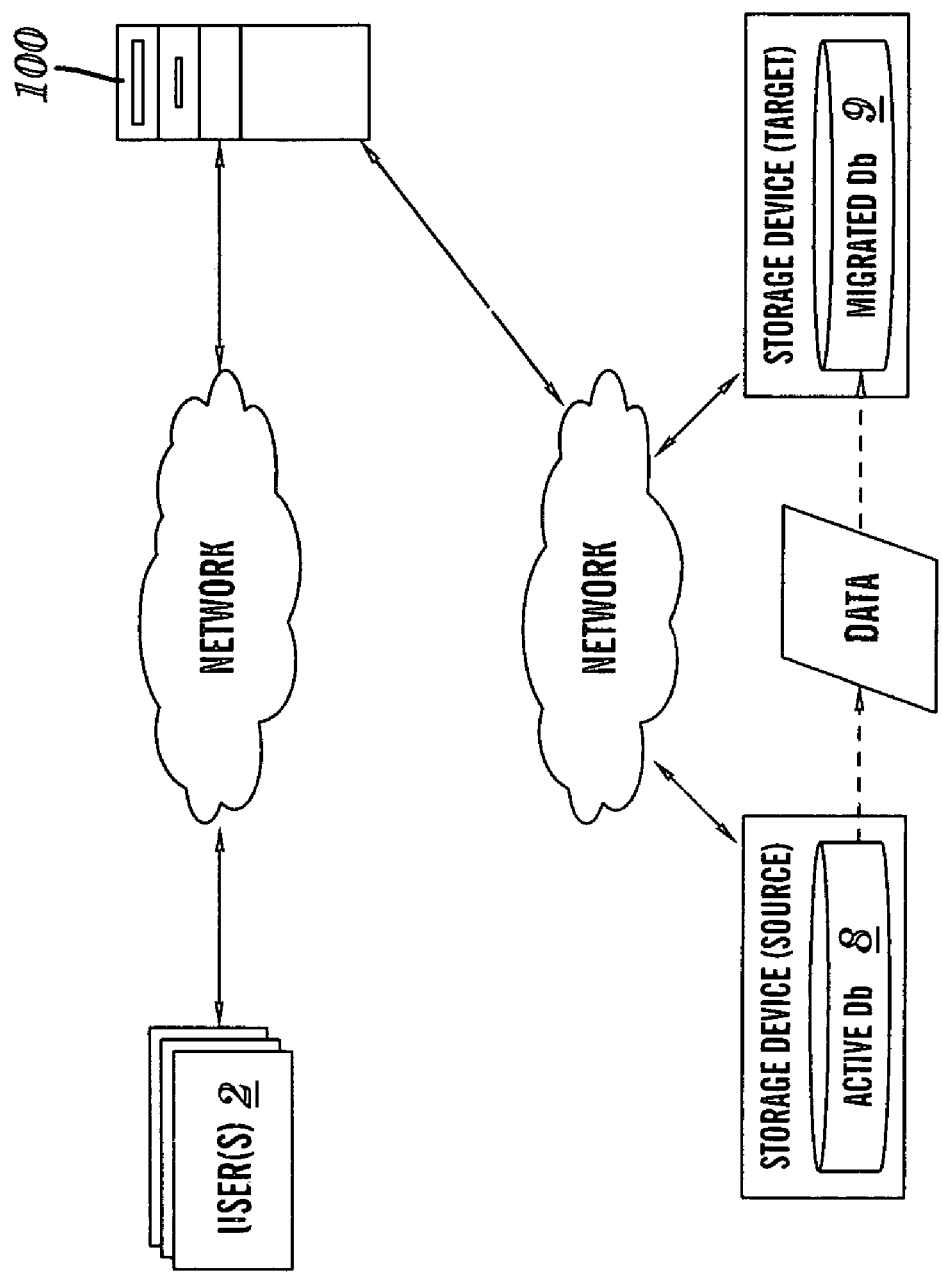

Referring to FIGS. 1A–1B, exemplary situations in which the present invention is applicable are shown. In FIG. 1A, a customer (not shown) with at least one user 2 to whom an application service provider (ASP) is providing service resides in Location One, e.g., Delaware. A server 4 (i.e., source server) used by the customer also exists in Location One. In the FIG. 1A situation, the customer moves from Location One to Location Two, e.g., Denver, requiring the ASP to move the active database 8 near Location Two to reduce network delay in their operation. In this case, ASP must set up a server 6 (i.e., target server) in Location Two, or in a close proximity, and migrate active database 8 from Location One to Location Two without interrupting the service. The database at Location Two is referred to as the "migrated database 9" for reference purposes. The migration operation must be seamless (i.e., with no down time) to users 2 within the customer's organization. Transfer of the actual application may also be necessary to server 6 in Location Two.

Servers 4 and 6 generally are provided as application servers that include the particular ASP's application capable of accessing and modifying database 8. Servers 4 and 6, however, may also constitute a number of networked servers. For instance, each server 4, 6 may include an application server and a web server. The web server may provide service to transactions that are simply read functions, i.e., no data is changed. For example, of 1000 transaction requests at a financial institution, 500 may be account balance requests that a web server can respond to. The other 500 may be transfers that require application server attention and database revision.

With continuing reference to FIG. 1A, more frequent database migration is also advantageous where, for example, an organization utilizing services from the ASP has their business running in two time zones, i.e., Location One in New York and Location Two in Tokyo. In this scenario, the ASP must provide non-stop (24 hours, 7 days a week) availability to all users from both locations, but manage servers 4, 6 in such a manner that data is closer to the users working during the business hours. Hence, the database may move two or more times per day depending on how many time zones the customer operates in. Multiple daily database migrations may also be advantageous for other reasons such as backup.

Other situations in which the database migration finds application may include hardware and software installation, maintenance or repair (e.g., changing capacity, memory, CPU, and network bandwidth). For example, if data has been fragmented in the database and is in need of reorganization, most RDBMS systems cannot support reorganization in online or active mode due to the nature of the process. In this case, a new temporary server can be prepared while the users are on the old server. When all users have been routed to the new server, necessary maintenance can be applied to the old server. Upon completion of maintenance work, the changed database from the temporary server can be migrated back to the original server and users rerouted.

Referring to FIG. 1B., database migration need not occur between multiple servers but can occur between just the data storage devices of at least one server. FIG. 1B shows a central server 100 with two data storage devices accessible therefrom. As one with skill in the art will recognize, the above situations are merely exemplary and the present invention may find application in a wide variety of database migrations where access must be continuous.

FIGS. 1A–B show data storage devices that are accessible by at least one respective server but are discrete or separate from the server(s). However, one with skill in the art will recognize that database 8, 9 may be stored in a data storage device that is integral with a respective server. For purposes of this disclosure, therefore, the term "source," unless otherwise specified, will be used to refer to a server or data storage device from which the database is being transferred. Similarly, the term "target," unless otherwise specified, will be used to refer to a server or data storage device to which the database is being transferred. Of course, where the source and target are merely data storage devices, at least one server must be employed to accommodate the transfer. As also shown in FIGS. 1A–B, transfer of database from source to target may take place across a network such as a LAN, WAN, the Internet, etc.

Figure 2:
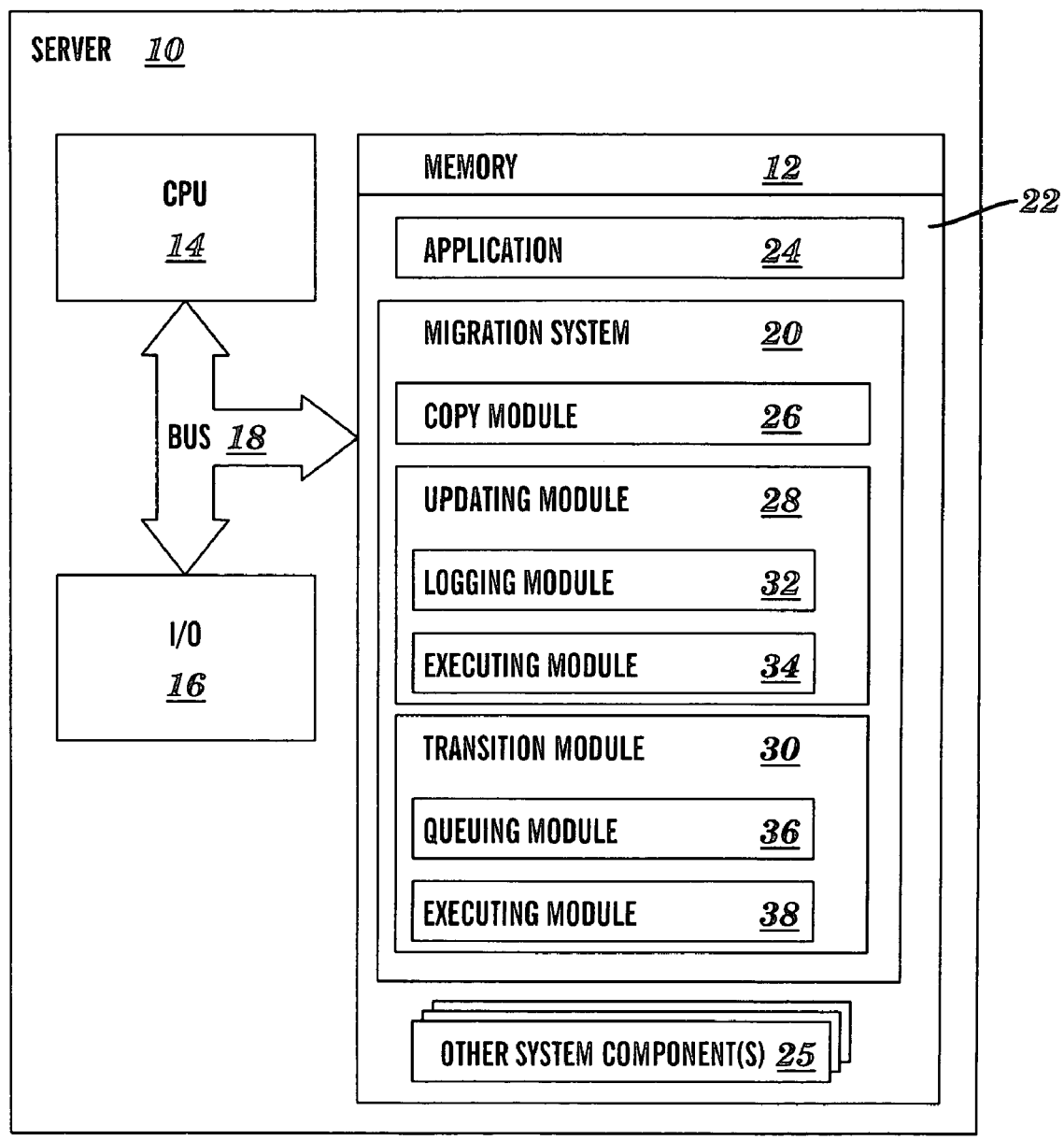
FIG. 2 shows a block diagram including a migration system of the invention.

Turning to FIG. 2, the details of the database migration system in accordance with the invention are shown in greater detail. Migration system 20 may be stored on a server 10, which may be a source server 4, a target server 6, another intermediary server or a combination of machines. In either situation, server 10 preferably includes a memory 12, a central processing unit (CPU) 14, input/output devices (I/O) 16 and a bus 18. Memory 12 (and each data storage device of FIGS. 1A–B) may comprise any known type of data storage system and/or transmission media, including magnetic media, optical media, random access memory (RAM), read only memory (ROM), a data object, etc. Moreover, memory 12 (and data storage devices) may reside at a single physical location comprising at least one type of data storage, or be distributed across a plurality of physical systems within a single location. CPU 14 may likewise comprise a single processing unit, or a plurality of processing units distributed across at least one location. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into server 10. A server computer typically comprises an advanced mid-range multiprocessor-based server, such as the RS6000 from IBM, utilizing standard operating system software, which is designed to drive the operation of the particular hardware and which is compatible with other system components and I/O controllers.

Memory 12 of server 10 preferably includes a program product 22 that, when executed by CPU 14, provides various functional capabilities for system 10. As shown in FIG. 2, program product 22 may include an application 24 and the database migration system 20. Server 10 need not include application 24. For instance, server 10 may be an intermediary server for the sole purpose of migrating the database. An "application" may consist of database tables and files on the file system, which are not managed by the database. For the applications that need the data stored in the database and external to the database, the invention addresses migrating the database portions.

With continuing reference to FIG. 2, other system components 25 such as communications software may also be provided. Migration system 20 includes a copy module 26, an updating module 28 and a transition module 30. Updating module 28 includes a logging module 32 and an executing module 34. Transition module 30 includes a queuing module 36 and an executing module 38. Executing modules 34 and 38 may be combined into a single module if desired.

In the following discussion, it will be understood that the method steps discussed preferably are performed by a processor, such as CPU 14 of server 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out at least one of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Figure 3A:
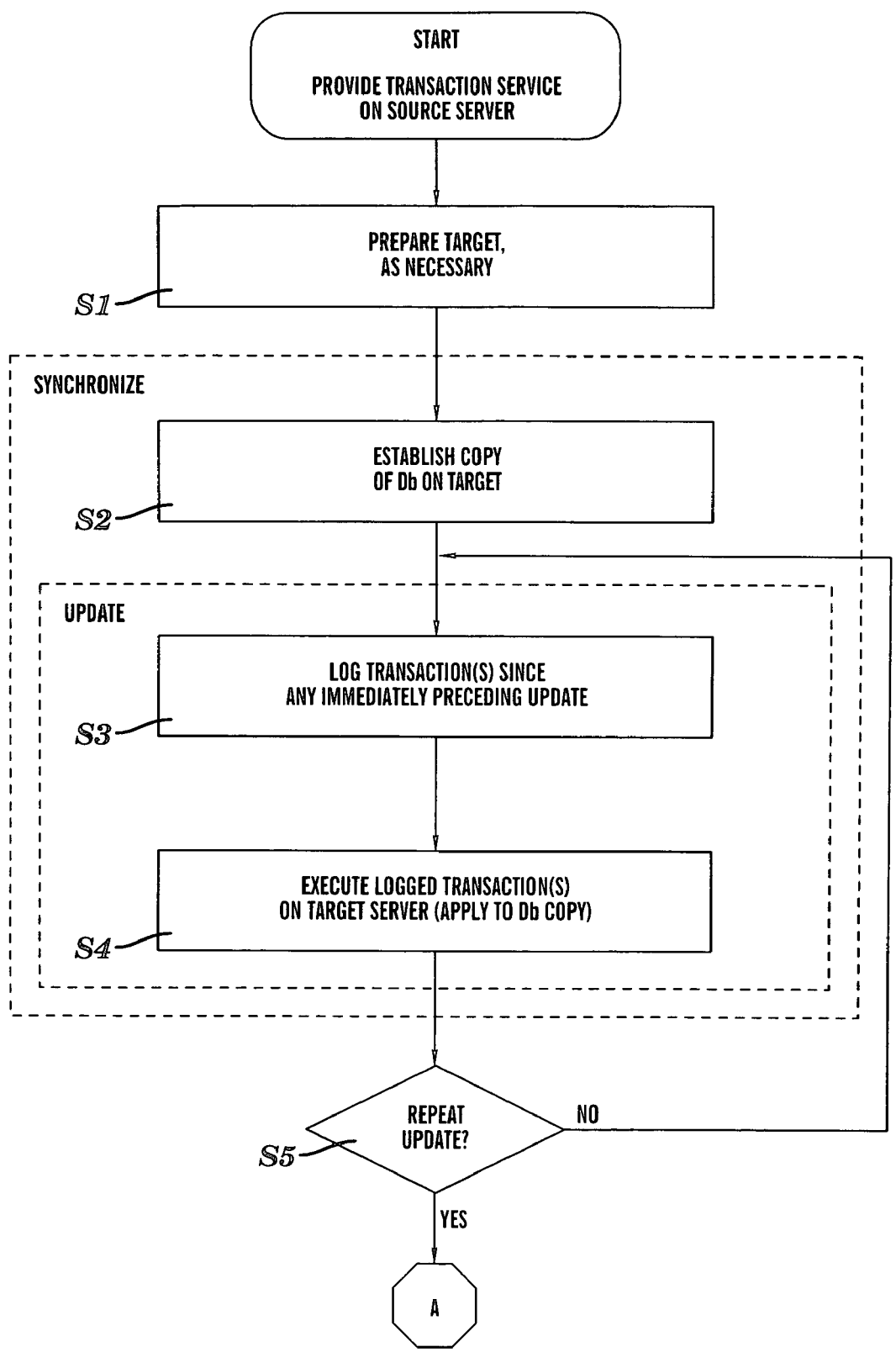
FIGS. 3A–B show a flow diagram of the logic of the migration system.
Figure 3B:
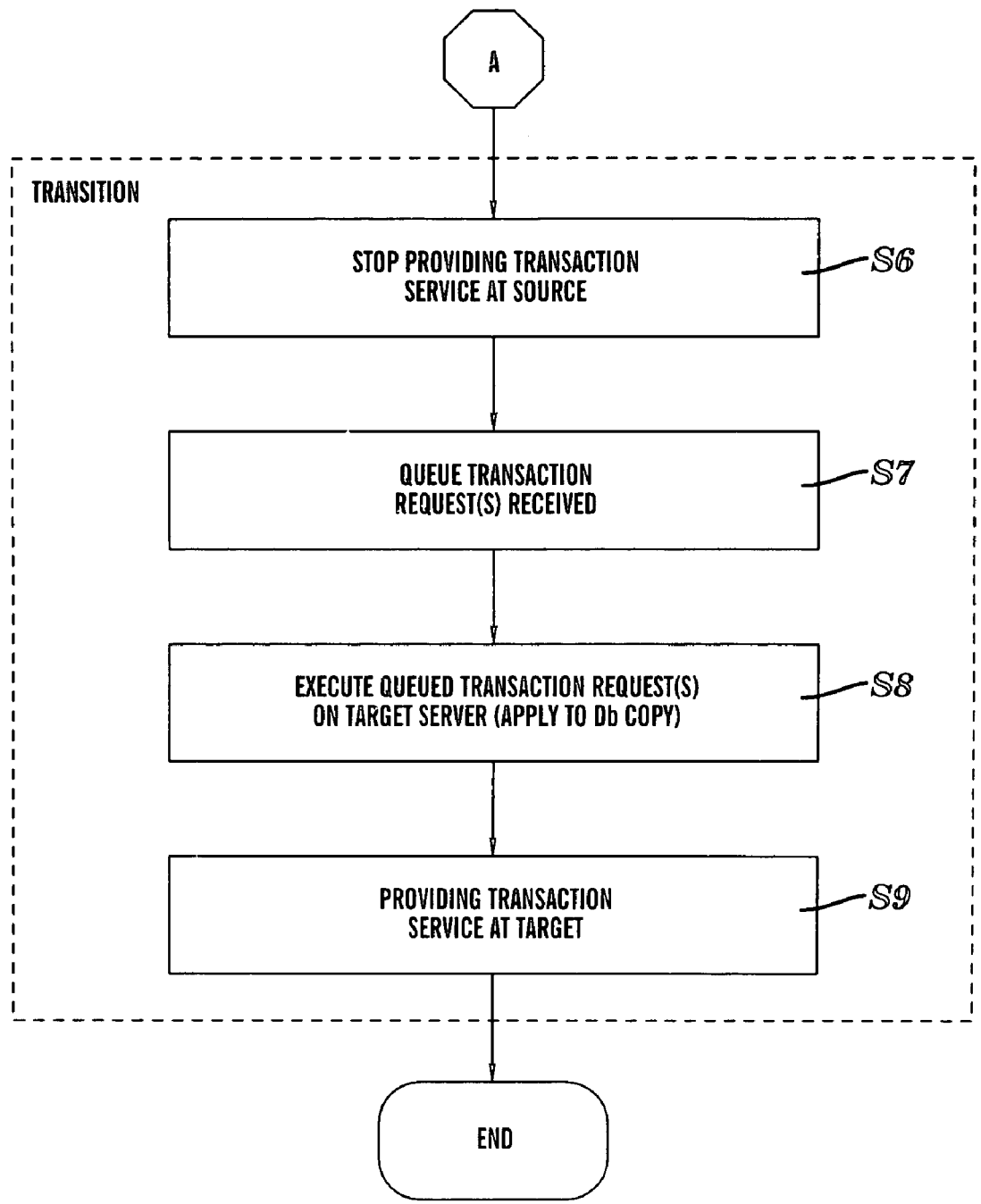

Turning to FIGS. 3A–B, the logic of database migration system 20 will be described in greater detail relative to one preferred embodiment of FIG. 1A, i.e., that of an ASP. At the outset, a source server 4 provides transaction services via an application 24. A "transaction" can be any conduct performed by the application of the ASP.

In step S1 of the migration process, the target is prepared, as necessary. Preparation may include such things as preparing the application environment and application on a target server; assuring storage requirements are met at a target data storage device, or assuring a database environment is present (e.g., a previous database to be overwritten is present), and/or that the version/release level of the RDBMS is compatible. Of course, a variety of preparation tasks may be possible and the above list is not exhaustive. In addition, step S1 may be skipped where no preparation is required.

Steps S2 to S4 represent a synchronization stage of the process during which transaction service continues at source server 4. In step S2, synchronization includes a copy of active database 8 from the source being established on the target by copy module 26. In one embodiment, this step may entail making a backup of active database 8 from the source and communicating it to the target. A database does not need to exist on the target in advance. When a database backup is restored to an existing database, the existing database inherits the alias and database names of the existing database. When restoring to a nonexistent database, the new database will be created with an alias and database name specified by a target-database-alias parameter. If an alias is not specified for migrated database 9, the database will inherit the alias and database name of the backed up database.

Transmission of active database 8 may be conducted to the target over a network such as a LAN, WAN or the Internet. The time it takes to send the data will depend on active database 8 size and network bandwidth. This step is preferably provided with database 8 in an active mode, i.e., database on source server 4 is available to users 2 while being backed up and copied to the target. In the case that target server 6 does not include application 24, this step may also include the transmission of application 24 from source server 4 to target server 6.

Steps S3 and S4 represent an update stage of the process within the synchronization stage. For purposes of this disclosure, the term "synchronization" includes the establishment of the database copy (step S3) or any update (steps S3 and S4). Step S3 includes logging at least one transaction that has occurred on source server 4 since any immediately preceding synchronization, i.e., establishment of database copy or any update. In a first reiteration of the update stage, the logged transactions would be those received and executed by source server 4 during the establishment of the copy of active database 8. Subsequent reiterations would include logged transactions received during the immediately preceding update (steps S3 and S4). At times, as discussed below, the logged transactions are transmitted to target server 6 by updating module 28.

Next, at step S4, the logged transactions are executed on target server 6 by executing module 34 directing application 24 on target server 6 to perform the transaction. More particularly, a trigger is initiated when the file is received at the target, which will direct target server 6 to execute the transaction(s) as a batch process. The term "execute," as used herein, means that the transactions are conducted by application 24 and applied to the migrated database 9. This execution generally occurs relatively quickly since target server 6 is not interacting with users 2. Simultaneously to step S4, transactions are continuing to be logged at source server 4 (step S3).

At step S5, whether to repeat the update stage is determined by updating module 28. The update stage may be repeated to assure that the target database is synchronized with the active database to an acceptable margin for transition of transaction service from source server 4 to target server 6. In one embodiment, this is accomplished by repeating the update stage at ever decreasing time intervals. That is, the update may be conducted for thirty (30) minutes, then fifteen (15) minutes, then five (5) minutes, then one (1) minute, then thirty (30) seconds, and so on. During each time interval, a number of transactions are logged from source server 4, and subsequently executed on target server 6 to update migrated database 9. As the time intervals decrease in duration, the number of logged transactions decrease and the active and migrated databases differ by smaller margins. At this point, migrated database 9 is being synchronized but not available for usage.

Whether to repeat the update stage can be evaluated in a variety of ways. In one embodiment, step S5 determines whether to repeat the update stage based on a 'time duration set point' being met (or exceeded). For example, the time duration set point may be two (2) seconds. Hence, when the decreasing time intervals reach two seconds, updating stops. In an alternative embodiment, whether to repeat the update stage is based on a set point of a number of logged transactions being met (or exceeded). For instance, if during a time interval, only two transactions are logged, a determination not to update can be made. In another embodiment, the determination may include the occurrence of a repeated state, e.g., the number of logged transactions being fewer than five for three consecutive update reiterations. After the set point has been met (or exceeded), the process proceeds with the transition stage as shown in FIG. 3B.

At this point, migrated database 9 is synchronized with active database 8, but transaction requests are still being received at source server 4.

Steps S6–S9 represent a transition stage of the process conducted by transition module 30. In step S6, transaction services are stopped on source server 4. In an alternative embodiment, step S6 may be omitted if duplicate databases are desired, e.g., when the source and target servers are allowed to service transactions simultaneously. In the latter case, target server 6 may signal source server 4 to indicate synchronization has occurred.

Next, at step S7, at least one transaction request received at source server 4 are queued by queuing module 36. Queuing may occur at source server 4, target server 6 or an intermediary server.

At step S8, the at least one queued transaction request are executed on target server 6 by executing module 38 directing application 24 of target server 6 to execute the queued transactions.

Finally, at step S9, transaction service is provided at target server 6. That is, users 2 are routed to target server 6 and transaction requests are fulfilled by target server 6.

In accordance with the invention, the transition stage proceeds very rapidly to keep transaction service stoppage at a minimum. For example, the transition stage may take only a few seconds such that transaction service stoppage is undetectable to users 2.

The above process may be repeated where necessary to migrate a database closer to users, e.g., where users are in different time zones.

The above system and method provide database migration of an active database from a source server to a target server while continuing to provide transaction service.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of migrating a database from a first server to a second server while continuing to provide transaction service, the method comprising the steps of:
   providing transaction service on the first server;
   establishing a database copy on the second server;
   logging at least one transaction from the first server to create a transaction log;
   executing the at least one logged transaction on the second server;
   repeating the steps of logging at least one transaction and executing the at least one logged transaction on the second server until a set point is met;
   queuing at least one transaction request;
   executing the at least one queued transaction request on the second server; and
   providing transaction service on the second server;
   wherein a time duration of each repeating step is necessarily shorter than a preceding repeating step, and transaction service on the second server is paused until the providing step.

2. The method of claim 1, wherein the step of providing transaction service on the first server ceases prior to the step of queuing at least one transaction request.

3. The method of claim 1, wherein a number of logged transactions executed during each repeating step is smaller than a preceding repeating step.

4. The method of claim 1, wherein the step of establishing a database copy on the second server includes transmitting of a database backup from the first server over a network.

5. The method of claim 4, wherein the network is the Internet.

6. The method of claim 1, further comprising the step of transmitting the transaction log to the second server over a network.

7. The method of claim 6, wherein the network is the Internet.

8. The method of claim 1, wherein the step of queuing takes place at the first server.

9. The method of claim 1, wherein the step of queuing takes place at the second server.

10. The method of claim 1, further comprising the step of transmitting an application from the first server to the second server.

11. A method of providing continuous transaction service while migrating a database from a source to a target, the method comprising the steps of:
    providing transaction service on a server that accesses the source;
    establishing a copy of the database on the target;
    updating the database copy until a set point is met by repeatedly:

logging at least one transaction from the server that accesses the source to create a transaction log, and executing the at least one logged transaction on a server that accesses the target;

queuing at least one transaction request;

executing the at least one queued transaction request on the server that accesses the target; and providing transaction service on the server that accesses the target;

wherein a time duration of each updating step is necessarily shorter than a preceding updating step, and transaction service on the second server is paused until the providing step.

12. The method of claim 11, wherein the server that accesses the source and the server that accesses the target are the same server.

13. The method of claim 11, wherein the server that accesses the source and the source are discrete.

14. The method of claim 11, wherein the server that accesses the target and the target are discrete.

15. The method of claim 11, wherein a number of logged transactions executed during each updating step is smaller than a preceding updating step.

16. The method of claim 11, wherein the step of establishing a database copy on the server that accesses the target includes transmitting of a database backup from the source server over a network.

17. The method of claim 16, wherein the network is the Internet.

18. The method of claim 11, further comprising the step of transmitting the transaction log to the target server over a network.

19. The method of claim 18, wherein the network is the Internet.

20. The method of claim 11, wherein the step of queuing takes place at the server that accesses the source.

21. The method of claim 11, wherein the step of queuing takes place at the server that accesses the target.

22. The method of claim 11, wherein at least one of the server is connected to a network.

23. The method of claim 22, wherein the network is the Internet.

24. A method of migrating a database from a source to a target while allowing continuous transaction service on at least one server that access the database, the method comprising the steps of:

establishing an initial copy of the database on the target;

updating the initial copy until a set point is met by repeatedly:

logging at least one transaction from a server that accesses the source to create a transaction log, and executing the at least one logged transaction on a server that accesses the target;

queuing at least one transaction request; and executing the at least one queued transaction request on the server that accesses the target;

wherein a time duration of each updating step is necessarily shorter than a preceding updating step, and transaction service on the second server is paused until after the executing step.

25. The method of claim 24, wherein the server that accesses the source and the server that accesses the target are the same server.

26. The method of claim 24, wherein the server that accesses the source and the source are discrete.

27. The method of claim 24, wherein the server that accesses the target and the target are discrete.

28. A system for migrating a database from a first server to a second server while continuing to provide transaction service, each server including an application that interacts with the database during execution of a transaction, the system comprising:

a copy module that establishes a database copy on the second server;

an updating module that updates the database copy until a set point is met by repeatedly:

logging at least one transaction from the first server received since any immediately preceding synchronization to create a transaction log;

executing the at least one logged transaction on the second server; and a transition module that queues at least one transaction request, and executes the at least one queued transaction request on the second server;

wherein a time duration of each activation of the updating module is necessarily shorter than a preceding activation, and transaction service on the second server is paused until after an activation of the transition module.

29. The system of claim 28, wherein the copy module establishes the database copy by transmitting a backup of the database over a network to the second server.

30. The system of claim 28, wherein a number of logged transactions executed during each activation of the updating module is smaller than an immediately preceding activation of the updating module.

31. The system of claim 28, wherein the updating module transmits the transaction log to the second server aver a network.

32. The system of claim 28, wherein the transition module queues the at least one transaction request at the first server.

33. The system of claim 31, wherein the transition module queues the at least one transaction request at the second server.

34. The system of claim 28, wherein the transition module is activated after a time duration that the updating module is activated reaches a set point.

35. The system of claim 28, wherein the transition module is activated after a number of logged transactions reaches a set point.

36. A system for migrating a database from a first server to a second server while continuing to provide transaction service, each server including an application that interacts with the database during execution of a transaction, the system comprising:

means for establishing a database copy on the second server;

means for logging at least one transaction from the first server to create a transaction log;

means for executing the at least one logged transaction on the second server;

means for queuing at least one transaction request; and means for executing the at least one queued transaction request on the second server;

wherein the logging means further repeats logging at least one transaction and executing the at least one logged transaction on the second server prior to the queuing until a set point is met;

wherein a time duration of each repeating is necessarily shorter than a preceding repeating, and transaction service on the second server is paused until after an activation of the executing means.

37. A computer program product comprising a computer useable medium having computer readable program code embodied therein for migrating a database from a first server to a second server while continuing to provide transaction service, each server including an application that interacts with the database during execution of a transaction, the computer program product comprising:

program code configured to establish a database copy on the second server;

program code configured to update the database copy until a set point is met by repeatedly:
logging at least one transaction from the first server to create a transaction log, and
executing the at least one logged transaction on the second server;

program code configured to queue at least one transaction request; and program code configured to execute the at least one queued transaction request on the second server, wherein a time duration of each updating conducted by the updating program code is necessarily shorter than a preceding updating, and transaction service on the second server is paused until after an execution of the program code configured to execute.

38. A system for providing continuous transaction service while migrating a database, the system comprising:

a source server for providing transaction services;

a target server for providing transaction services;

a copy module that establishes a database copy on the target server;

an updating module that updates the database copy until a set point is met by repeatedly:
logging at least one transaction from the source server received since any immediately preceding synchronization to create a transaction log;
executing the at least one logged transaction on the target server; and a transition module that queues at least one transaction request, and executes the at least one queued transaction request on the target server;

wherein a time duration of each activation of the updating module is necessarily shorter than a preceding activation, and transaction service on the second server is paused until after an activation of the transition module.

39. The system of claim 38, wherein the copy module establishes the database copy by transmitting a backup of the database over a network to the target server.

40. The system of claim 38, wherein a number of logged transactions executed during each activation of the updating module is smaller than an immediately preceding activation of the updating module.

41. The system of claim 38, wherein the updating module transmits the transaction log to the target server over a network.

42. The system of claim 38, wherein the queuing module queues the transaction requests at the source server.

43. The system of claim 38, wherein the queuing module queues the transaction requests at the target server.

44. The system of claim 38, wherein the transaction module is activated after a time duration that the updating module is activated reaches a set point.

45. The system of claim 38, wherein the transition module is activated after a number of logged transactions reaches a set point.

* * * * *

UNITED STATES PATENT AND TRADEMARK OFFICE
CERTIFICATE OF CORRECTION

| | | |
|---|---|---|
| PATENT NO. | : 7,065,541 B2 | Page 1 of 1 |
| APPLICATION NO. | : 09/973810 | |
| DATED | : June 20, 2006 | |
| INVENTOR(S) | : Gupta et al. | |

It is certified that error appears in the above-identified patent and that said Letters Patent is hereby corrected as shown below:

Claim 31, column 10, line 31, please delete " aver " and insert -- over --.

Signed and Sealed this

Seventeenth Day of October, 2006

JON W. DUDAS
*Director of the United States Patent and Trademark Office*